Nov. 1, 1955 W. ELSHOLZ 2,722,068
TRUE COURSE BRACKETING MEANS
Filed July 27, 1953
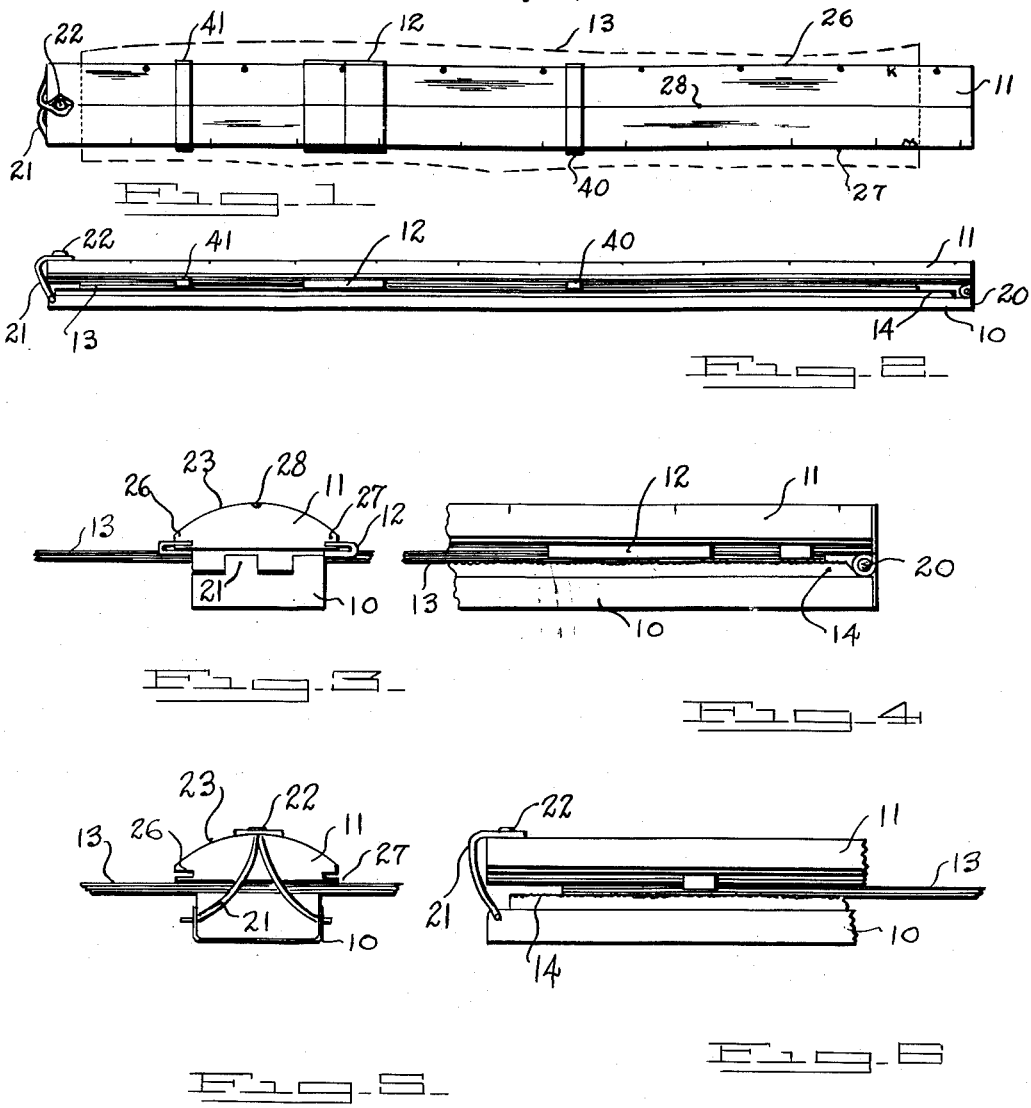
INVENTOR.
BY Walter Elsholz
Daniel G. Cullen
Attorney

United States Patent Office 2,722,068
Patented Nov. 1, 1955

2,722,068
TRUE COURSE BRACKETING MEANS
Walter Elsholz, St. Clair, Mich.
Application July 27, 1953, Serial No. 370,343
1 Claim. (Cl. 40—10)

Be it known that the undersigned has invented certain new and useful improvements in true course bracketing means of which the following is a specification.

This application relates to true course bracketing means for use as a navigation or flying aid.

The true course bracketing means hereof is a device which clamps securely over a map to hold it and frame and bracket the intended flight path and has a transparent strip provided with a true course line mark which is aligned with the intended true course line of the map. The side edges of the transparent strip then outline or frame or bracket the side edges of the intended flight path. A transparent flight bracket member slidably mounted on the strip may be moved along the strip to indicate at any moment the then area of flight. Additional movable brackets on the strip may be positioned to define or bracket the beginning and ends of the intended flight path.

The means is particularly intended to provide a clamp and holder for a map and likewise a handle by which the map may be easily grasped for reading, with the strip and bracket focusing the attention of the navigator at once on the important elements for navigation, namely, the true course line, the intended flight path and its side limits, the then area of flight, and the beginning and ends of the intended flight path.

In addition, the device is so constructed as to enable a thin sheet protractor of conventional compass rose form to be inserted edgewise into the device and be clamped in place over the map to permit a quick and easy reading of the true course heading, the angle between the true course line and the meridians of longitude.

Most particularly is it an aim and object of the present invention to provide a device which is inexpensive of construction, simple of form and easy and convenient to use for holding and framing a map and for bracketing the true course and thus enabling an aviator during flight to grasp and read his map instantly and to focus his attention instantly upon the important elements for navigation at the moment, namely, flight path and the then area of flight.

For an understanding of the device, reference should be had to the appended drawing.

In this drawing:

Fig. 1 is a top plan view of the device to half scale with a map section in place.

Fig. 2 is a side view of Fig. 1.

Figs. 3 and 5 are end views to full scale.

Figs. 4 and 6 are fragmentary side views to full scale.

The device or map holding and map framing and true course bracketing means hereof comprises a base 10, a lens 11 and a flight bracket member 12.

The base 10 is flat topped and rigid and is elongated sufficiently to receive on it a map 13 or a conventional folded map or chart section and for this purpose, therefore, the base is made 14 inches in length in order to accommodate conventional folded map sections. The base is of channel form and contains a slab or strip 14 of rubber whose face is roughened to provide a friction or non-slip surface for the base against which the map is positioned and thus to insure against the map shifting with respect to the base during the use of the device.

The lens 11 is formed at its ends with means 20 and 21 for movably and adjustably securing it at its ends to the ends of the base whereby a map may be clamped in place on the base beneath the lens. In the particular embodiment disclosed the means 20 is a conventional hinge and the means 21 is a wire hook or spring type fastener, hinged to the base and latching over a pin 22.

The lens 11 is formed of an elongated flat bottomed rigid slab or strip of transparent material with a convex surface for magnification and easy reading.

The lens has two side edge grooves 26 and 27 defining side rails. The side edges 26—27 are uniformly marked at M and K to indicate distance in miles on one edge and on the other edge distance in knots.

Central between the two side rails 26 and 27 is a true course line mark 28 which in the form illustrated is a fine grooved and marked line on the bottom of the lens.

The flight bracket member 12 is formed for boxing or bracketing an area of flight and is formed to be slidable along the lens and has its side edges turned over so as to coact with the side grooves or rails 26 and 27 of the lens and enable the bracket 12 to be held in place and likewise to be guided in its longitudinal sliding movement by the lens rails and is constructed to permit view through it of the map between it for indicating at any moment the then area of flight. It is a sheet of transparent material positioned between the base and the lens and having its side edges turned over to receive the side edges of the lens or strip of transparent material 11 to enable the bracket to be moved longitudinally in a guided relation to the lens.

The true course line mark 28 will define on the map beneath it the true course line. The side rails 26 and 27 will define on the map beneath it the side edges of the intended flight path. The flight bracket member 12 is movable along the lens for defining at any moment the then area of flight on the map.

End brackets 40 and 41 similar in form but narrower than the flight bracket 12 are slidably mounted on the side rails or edges 26—27 of lens 11 to be positioned along the lens 11 at the beginning and end of the flight course or line to indicate and thus bracket the beginning and ends of the intended flight path.

The lens 11 and its manner of being secured to the base 10 are such as to enable a conventional thin disk compass rose protractor to be inserted edgewise and laterally of the lens between it and the map and be held there by the lens above the map to enable the flier to read the true course heading, the angle beween the true course line and the meridians of longitude on the map, after which the protractor may be removed so as in no way to interfere with the use of the device during flying for quick and easy reading.

I claim:

A map holding and framing and true course bracketing means comprising a rigid long narrow flat top base, a rigid long narrow flat bottom overlying lens, means for movably and adjustably securing the lens at its ends to the ends of the base for clamping a map in place between the base and the lens, in surface contact with both base and lens, the lens having on its bottom face a central line mark between and parallel to its edges, and having two side edge rails, and a cursor between the base and lens and having a transverse line mark on it, said cursor being transparent and being slidable along said lens and held in place and guided by the coaction of the cursor with the side rails of said lens.

References Cited in the file of this patent
UNITED STATES PATENTS

| 1,667,449 | Wompner | Apr. 24, 1928 |
| 1,933,054 | Grace | Oct. 21, 1933 |
| 2,169,786 | Baum | Aug. 15, 1939 |
| 2,501,550 | Tamagna et al. | Mar. 21, 1950 |
| 2,527,071 | Pierce | Oct. 24, 1950 |